US009930421B2

(12) United States Patent
Wachob et al.

(10) Patent No.: US 9,930,421 B2
(45) Date of Patent: *Mar. 27, 2018

(54) SYSTEM AND METHOD FOR PROVIDING DATA COMMUNICATION SERVICES THROUGH A CATV TAP-OFF DEVICE

(71) Applicant: Antronix Inc., Cranbury, NJ (US)

(72) Inventors: David Wachob, New Hope, PA (US); Neil Tang, Marlboro, NJ (US)

(73) Assignee: Antronix Inc.

( * ) Notice: Subject to any disclaimer, the term of this patent is extended or adjusted under 35 U.S.C. 154(b) by 0 days.

This patent is subject to a terminal disclaimer.

(21) Appl. No.: 15/398,058

(22) Filed: Jan. 4, 2017

(65) Prior Publication Data
US 2017/0118527 A1 Apr. 27, 2017

Related U.S. Application Data

(63) Continuation of application No. 14/309,805, filed on Jun. 19, 2014, now Pat. No. 9,554,194.
(Continued)

(51) Int. Cl.
H04N 7/173 (2011.01)
H04N 21/61 (2011.01)
(Continued)

(52) U.S. Cl.
CPC ............ *H04N 21/615* (2013.01); *H04N 7/12* (2013.01); *H04N 21/2221* (2013.01);
(Continued)

(58) Field of Classification Search
CPC .... H04N 21/426; H04N 21/2221; H04N 7/10; H04N 7/12
(Continued)

(56) References Cited

U.S. PATENT DOCUMENTS 5,765,099 A    6/1998  Georges et al.
6,915,530 B1 *  7/2005  Kauffman ............. H04N 7/102
                                                    348/E7.052
(Continued)

FOREIGN PATENT DOCUMENTS

WO        0022821    4/2000
WO      2013108938    7/2013

OTHER PUBLICATIONS

Using WiPNET to Connect the Home With the Existing COAX Network, Interview with Adam Lenio, Feb./Mar. 2012.
(Continued)

Primary Examiner — Hunter B Lonsberry
Assistant Examiner — Sahar Baig
(74) Attorney, Agent, or Firm — The Belles Group, P.C.

(57) ABSTRACT

In one embodiment, a system for providing data communication services includes a cable television (CATV) tap-off device including a signal splitter communicably coupled to a tap-off access point and a first signal transceiver, the CATV tap-off device being configured to communicate a CATV signal with a CATV network through the splitter; and a CATV gateway device communicably coupled to the signal splitter through a first coaxial cable to communicate the CATV signal with the CATV tap-off device. The CATV gateway device is configured to split the CATV signal into a television signal and a baseband data signal. A second signal transceiver of the CATV gateway device is configured to communicate the baseband data signal as a transceiver signal over the first coaxial cable to the first signal transceiver. The tap-off access point is configured to wirelessly transmit a first wireless signal based on the transceiver signal.

20 Claims, 10 Drawing Sheets

Related U.S. Application Data

(60) Provisional application No. 61/960,767, filed on Sep. 26, 2013, provisional application No. 61/956,907, filed on Jun. 20, 2013.

(51) Int. Cl.
*H04N 21/222* (2011.01)
*H04N 21/426* (2011.01)
*H04N 7/12* (2006.01)
*H04N 7/10* (2006.01)

(52) U.S. Cl.
CPC ....... *H04N 21/426* (2013.01); *H04N 21/6118* (2013.01); *H04N 21/6168* (2013.01); *H04N 7/10* (2013.01); *H04N 7/17354* (2013.01)

(58) Field of Classification Search
USPC .......................................... 725/127, 133, 149
See application file for complete search history.

(56) References Cited

U.S. PATENT DOCUMENTS

| | | | | |
|---|---|---|---|---|
| 8,370,886 | B2* | 2/2013 | Karpati | H04N 7/104 725/105 |
| 9,113,187 | B2* | 8/2015 | Conroy | H04N 21/41 |
| 2002/0095498 | A1* | 7/2002 | Chanda | H04L 12/2889 709/225 |
| 2003/0045284 | A1 | 3/2003 | Copley et al. | |
| 2003/0046706 | A1* | 3/2003 | Rakib | H04L 45/10 725/111 |
| 2007/0019959 | A1* | 1/2007 | Retnasothie | H04B 10/25752 398/115 |
| 2007/0118859 | A1* | 5/2007 | Tsukahara | H04H 40/90 725/68 |
| 2011/0193701 | A1 | 8/2011 | Hanft | |
| 2011/0314492 | A1 | 12/2011 | Cassidy et al. | |
| 2013/0322504 | A1* | 12/2013 | Asati | H04L 41/0853 375/224 |
| 2014/0334288 | A1* | 11/2014 | Hong | H04L 12/6418 370/216 |

OTHER PUBLICATIONS

Introduction to in-Building Wireless Signal Distribution for Public Safety, 2005-2007, Jack Daniel Company.

WAP-001 in Wall Access Point Description, www.handlink.com, 2012.

Wifi Tap-Off, Netwave Co., Ltd., May 2010.

\* cited by examiner

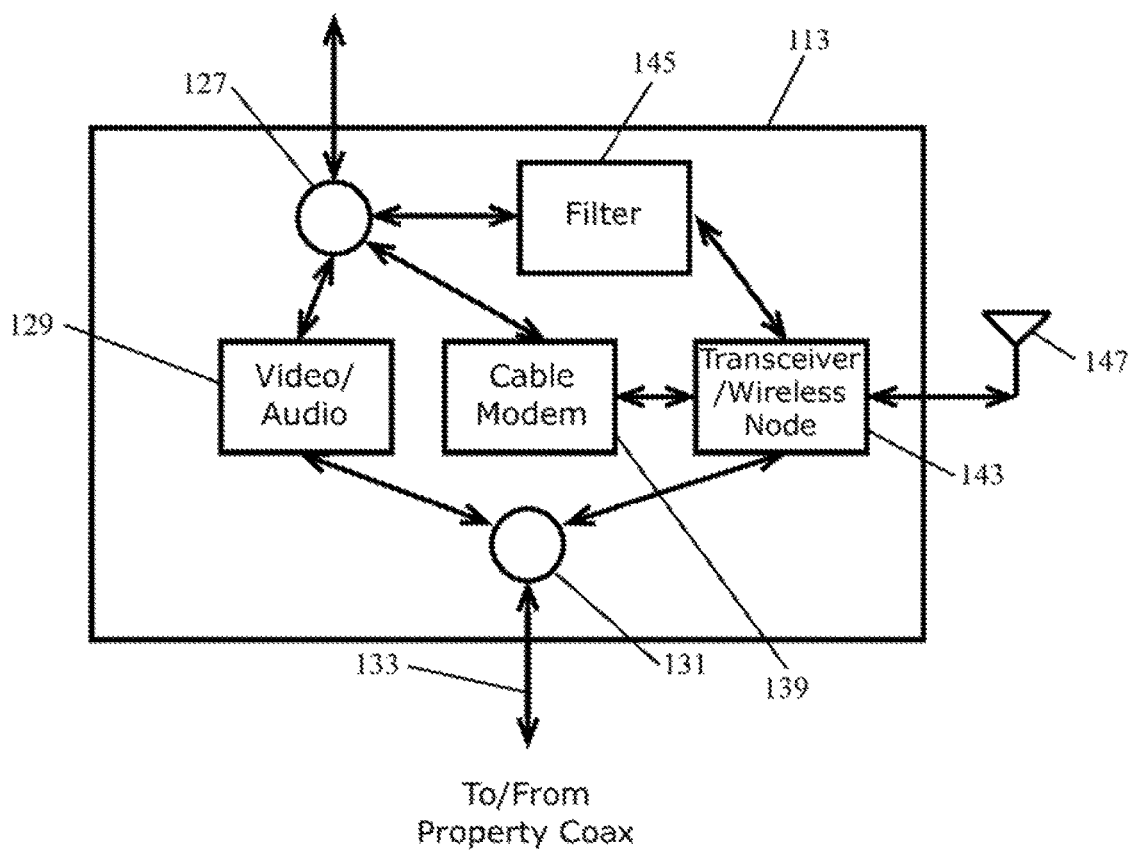

SYSTEM AND METHOD FOR PROVIDING DATA COMMUNICATION SERVICES THROUGH A CATV TAP-OFF DEVICE

CROSS REFERENCE TO RELATED APPLICATIONS

The present application is a continuation of U.S. patent application Ser. No. 14/309,805, filed Jun. 19, 2014, which claims the benefit of U.S. Provisional Application No. 61/956,907, filed Jun. 20, 2013, and U.S. Provisional Application No. 61/960,767, filed Sep. 26, 2013. The disclosures of the aforementioned priority applications are incorporated herein by reference in their entirety.

FIELD OF THE INVENTION

The field of the present invention relates to systems and methods for providing data communication services through a cable television (CATV) tap-off device.

BACKGROUND OF THE INVENTION

A CATV network generally provides data services, for both residential and commercial purposes, that include both broadcast audio and video (i.e., television) programming and data services by providing access to the CATV network through a CATV tap-off device. The CATV tap-off device is frequently located near the perimeter of a property so that the cable service provider has easy access to the device. Since most CATV networks are generally connected to other public networks, such as the internet properties are able to enjoy wide-ranging data services through the network connection provided through the CATV tap-off device. The network service from the CATV tap-off device may be extended into a building on a property by installation of equipment for a local area network (LAN). In addition, wireless networking devices, such as WiFi devices, may be incorporated into the LAN to facilitate access to the network.

One problem frequently encountered with such LANs is the difficulty of extending the network to the outside of a building from the inside, or achieving more complete coverage within a building, as WiFi frequencies can be significantly attenuated by walls. One potential solution proposed to overcome this problem of extending the wireless portion of a LAN to the exterior of a building is disclosed in WO2013108938. In that proposed system, the CATV tap-off device includes a wireless access point so that wireless LAN service may be provided within an area of the CATV tap-off. Further, by having several CATV tap-offs connected along a corridor defined by the CATV network lines, each tap-off having a wireless access point, a wireless LAN can be created. However, such a wireless LAN has obvious limitations in that it is unlikely to extend much into buildings adjacent the corridor. The extent that the wireless LAN reaches into the building depends on many factors, including the materials from which the building is constructed, the layout of the building (e.g., how large the floors are, how many floors, etc.), and the types of other potentially interfering devices in use within the building (e.g. microwave ovens, cordless phones, baby monitors, and the like), and the types of interfering devices around the exterior of the building.

SUMMARY OF THE INVENTION

The present invention is directed toward a system and method for providing data communication services through a cable television (CATV) tap-off device. The data communication services may be in the form of wireless communications provided by a wireless transceiver at the tap-off device, wireless communications provided by one or more wireless transceivers located in and around a building, communications provided by one or more cable-based transceivers, such as Ethernet, or any combination of transceivers. The system and method enable a more comprehensive wireless and wired communications network to be created in and around a property, and particularly enabling a more reliable wireless network in and around a building on a property.

In a first separate aspect of the present invention, a system for providing data communication services includes a CATV tap-off device and a CATV gateway device. The CATV tap-off device includes a signal splitter communicably coupled to a tap-off access point and a first signal transceiver, and the CATV tap-off device is configured to communicate a CATV signal with a CATV network through the splitter. The CATV gateway device is coupled to the signal splitter through a first coaxial cable to communicate the CATV signal with the CATV tap-off device. The CATV gateway device includes a second signal transceiver and is configured to split the CATV signal into a television signal and a baseband data signal. The second signal transceiver is configured to communicate the baseband data signal as a transceiver signal over the first coaxial cable to the first signal transceiver. The tap-off access point is configured to transmit a first wireless signal based on the transceiver signal.

In a second separate aspect of the present invention, a system for providing data communication services includes a CATV tap-off device and a plurality of CATV gateway devices. The CATV tap-off device includes a signal splitter communicably coupled to a tap-off access point and a first signal transceiver, and the CATV tap-off device is configured to communicate a CATV signal with a CATV network through the splitter. Each CATV gateway device: is communicably coupled to the signal splitter through a first coaxial cable to receive the CATV signal from the CATV tap-off device; includes a second signal transceiver; and is configured to split the CATV signal into a television signal and a baseband data signal. Each second signal transceiver is configured to communicate the baseband data signal as a transceiver signal over the first coaxial cable to the first signal transceiver, with the transceiver signal being communicated in a first frequency spectrum. The first signal transceiver is configured to convert the transceiver signal into a first wireless signal, and the tap-off access point is configured to transmit the first wireless signal. A band reject filter is operatively disposed between the signal splitter and the CATV network, and the band reject filter is configured to reject the first frequency spectrum.

In a third separate aspect of the present invention, a method for providing data communication services includes: splitting a CATV signal from a CAW network at a CATV tap-off device to pass a split CATV signal to a CATV gateway device over a first coaxial cable; splitting the split CATV signal into a television signal and a baseband data signal at the CATV gateway device; communicating the baseband data signal as a transceiver signal over the first coaxial cable to a first signal transceiver of the CATV tap-off device from a second signal transceiver of the CATV gateway device; and converting the transceiver signal to a first wireless signal at the CATV tap-off device.

In a fourth separate aspect of the present invention, a system for providing data communication services includes a CATV tap-off device and a CATV gateway device. The CATV tap-off device includes a signal splitter communicably coupled to a tap-off access point, and the CATV tap-off device is configured to communicate a CATV signal with a CATV network through the splitter. The CATV gateway device is communicably coupled to the signal splitter through a first coaxial cable to communicate the CATV signal with the CATV tap-off device. The CATV gateway device includes a wireless signal converter and is configured to split the CATV signal into a television signal and a baseband data signal. The wireless signal converter is configured to convert the baseband data signal to a wireless signal and to transmit the wireless signal over the first coaxial cable to the tap-off access point. The tap-off access point is configured to transmit the wireless signal.

Accordingly, an improved system and method for providing data communication services through a CATV tap-off device are disclosed. Advantages of the improvements will be apparent from the drawings and the description of the preferred embodiment.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures:

FIG. 2A is a schematic diagram showing a gateway device for the system of FIG. 1;

DETAILED DESCRIPTION OF THE INVENTION

Figure 1:
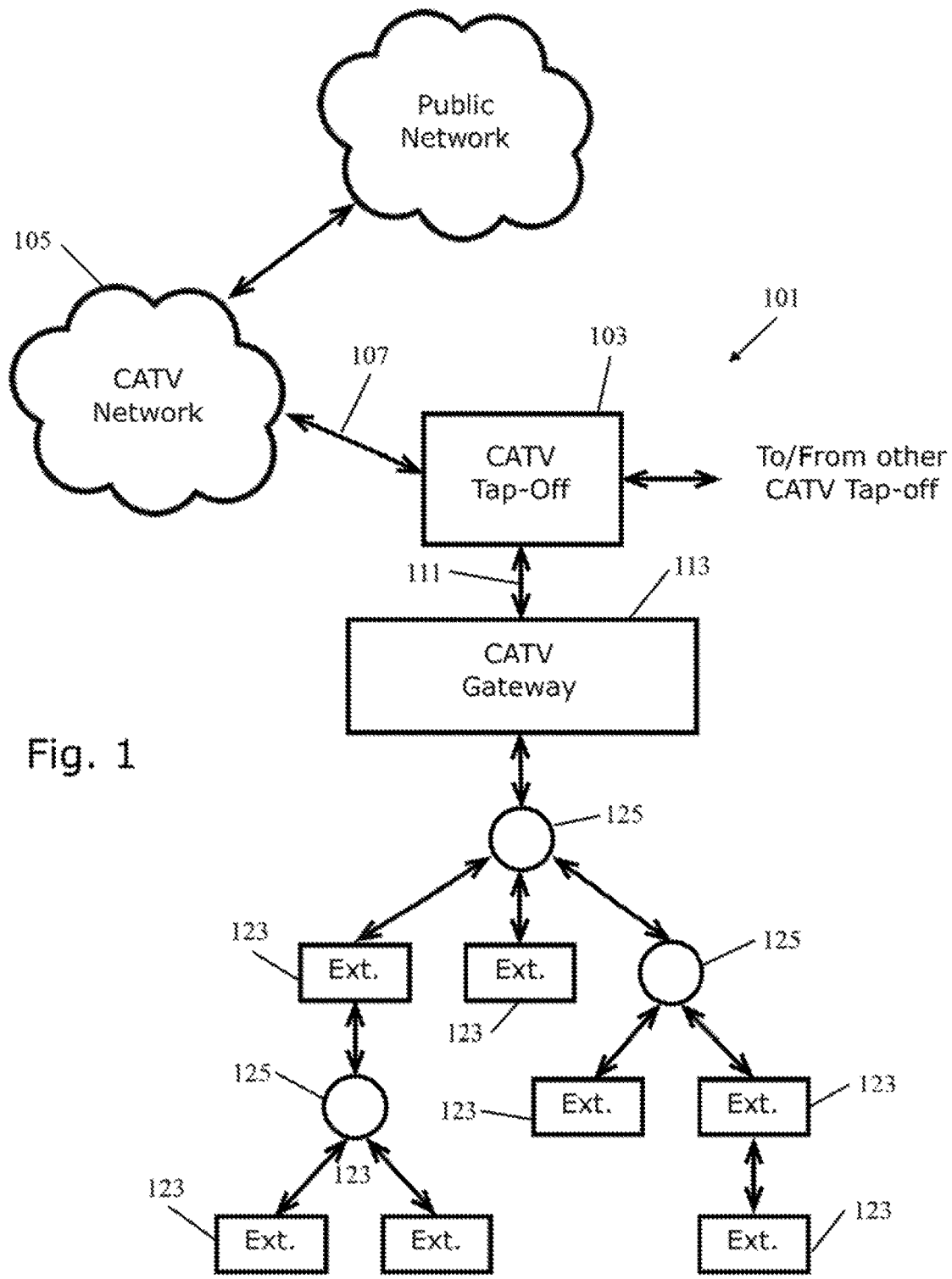
FIG. 1 is a schematic diagram showing a first system for providing data services through a CATV tap-off device.

Features of the present invention may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g. code). Various processors may be embodied in computer and/or server hardware of any suitable type (e.g. desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Bluetooth, LAN, etc.

Computer-executable instructions or programs (e.g. software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs is referred to hereinafter as a "programmable device", or just a "device" for short, and multiple programmable devices in mutual communication is referred to as a "programmable system". It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g. internal/external hard disks, floppy discs, magnetic tape CD-ROM, DVD-ROM, optical disk, ZIP™ drive, Blu-ray disk, and others), which may he written to and/or read by a processor operably connected to the medium.

In the following description and figures, where parts of the system are schematically shown and described as individual functional blocks (e.g., a filter, a mixer, a splitter, a transceiver, etc.), one of ordinary skill in the art will recognize that the functions of any one individual block may he integrated with the functions of one or more other individual blocks for purposes of implementation. For example, a filter may be integrated with a mixer or with a transceiver for a particular implementation. Those of skill in the art will recognize that several of the functional blocks may be integrated according to design choice.

Turning in detail to the drawings, FIG. 1 shows a first system 101 for providing data services through a CATV tap-off device 103. The CATV tap-off device 103 is connected to the CATV network 105 through a network coaxial cable 107 for receiving a CATV signal. The network coaxial cable 107 may terminate at the CATV tap-off device 103, or it may pass through the CATV tap-off device 103 to provide the CATV signal to additional CATV tap-off devices (not shown). The CATV tap-off device 103 is connected through a gateway coaxial cable 111 to the CATV gateway device 113, which is placed at the point of entry for the property, which may be on the property, generally on the exterior of a building or structure, to provide easier access for service calls, or within a building or structure. The CATV tap-off device 103 may be connected to a number of additional CATV gateway devices, whether those additional CATV gateway devices are placed on the same property or on other properties. For purposes of the discussion below, unless otherwise noted, each additional CATV gateway device operates in the same manner, with the same functionality.

The incoming CATV signal is split off from the main CATV signal at the CATV tap-off device 103 and passed to the CATV gateway device 113 and is used to provide both a broadcast audio and video services signal and a data services signal to the property. Although typically broadcast audio and video services signal is sent over the CATV network 105, and thus to the CATV tap-off device 103 as a form of data signal, the two types of data signals are typically viewed as being distinct within the industry and treated differently for delivery to the end user, and so they are differentiated here as well. For example, the broadcast audio and video services signal is typically directed toward a set-top television device, or to a television itself, when the television is fitted with an appropriate cable television decoder, and the data services signal is split from or filtered out of the incoming CATV signal so that the broadcast audio and video services signal may be used to create a visual and audio display on the television. On the other hand, the data services signal is typically directed first to a cable modem, and from there to one or more computing, devices (e.g., a server, a personal computer, a smart phone, and the like), and the broadcast audio and video services signal is split from or filtered out of the incoming CATV signal so that the data services signal may be utilized by the cable modem. The manner in which the different parts of the incoming CATV signal are processed are well known to those of skill in the art, and thus such signal processing details are not addressed in detail.

The data services provided to a property may utilize any combination of wired (e.g., coaxial cable, Ethernet, and the like) or wireless (e.g., WiFi, and the like) technologies to distribute the network throughout a property. However, as will be discussed in further detail below, the CATV gateway device 113 and coaxial cable lines throughout the property and/or structure may be utilized to distribute the data services signal throughout the property and/or structure, thereby enabling data services throughout the property and/or structure. This is done by communications between the CATV gateway device 113 and one or more extension devices 123 over the coaxial cable lines on the property and/or within the structure. Where multiple extension devices 123 are used, as shown in FIG. 1, data services may be created on the property having a tree structure, by connecting one or more extension devices 123 through one or more signal splitters 125. Unless otherwise indicated herein, any signal splitter may also be used as a signal combiner, depending upon the configuration of coupled devices. The data services signal can thereby be distributed throughout much or all of the property, both inside and outside of structures, without requiring any additional wired or wireless connections between access points.

The CATV gateway device 113 is shown in FIG. 2A. The incoming CATV signal is passed into the CATV gateway device 113 from the gateway coaxial cable 111, and a gateway signal splitter 127 splits the incoming CATV signal into the broadcast audio and video services signal and the data services signal. The broadcast audio and video services signal is passed to a video and audio processor 129, which process the broadcast audio and video services signal for use on the property, and passes the processed broadcast audio and video services signal to a signal combiner 131 The signal combiner 131 is coupled to a distribution coaxial cable 133, which connects the output signal from the CATV gateway device 113 to the coaxial cable network for the property. The coaxial cable network may have a plurality of termination points, and these termination points may include set-top boxes, televisions, extension devices 123, or any other device used by the property occupant to receive and process the output signal from the CATV gateway device 113.

The data services signal passes from the gateway signal splitter 127 to a cable modem 139, which demodulates the data services signal into a baseband data signal. In certain embodiments, the baseband data signal may be an Ethernet signal, a USB signal, and the like. In other embodiments, the baseband data signal may be any other signal type which suits the needs of a particular design implementation. The baseband data signal passes into a signal transceiver 143, which communicates the baseband data signal as the transceiver signal with other signal transceivers, one of which is incorporated into the CATV tap-off device 103, and others of which may be incorporated within the extension devices 123. The signal transceiver 143, which is configured to communicate the baseband data signal to other signal transceivers as a transceiver signal. Communicating the baseband data signal as a transceiver signal may be implemented in several different ways, with a couple different options for implementation discussed further below. In certain embodiments, a programmable processor may be coupled to the signal transceiver 143 in order to effectuate some of the functionality disclosed herein.

The signal transceiver 143 communicates the transceiver signal through a band pass filter 145 back to the gateway signal splitter 127, from which the transceiver signal passes onto the gateway coaxial cable 111 and back to the CATV tap-off device 103. The signal transceiver 143 may also communicate the transceiver signal with the signal combiner 131, from which the transceiver signal is directed toward one or more extension devices 123, as shown in FIG. 1. In certain embodiments, the signal transceiver 143 may also incorporate a gateway node so that the signal transceiver may also generate a wireless signal from the baseband data signal. The wireless signal may be wirelessly transmitted to one or more computing devices using the gateway antenna 147. The wireless signal may be a WiFi signal, or any other type of signal appropriate for communicating wirelessly between computing devices in other embodiments, the gateway node may be independent front the transceiver 143. By including a gateway node as part of the CATV gateway device 113, the CATV gateway device 113 may serve as a wireless access point.

Depending upon the characteristics of the chosen baseband data signal and the physical medium over which it is being transmitted, the baseband data signal may need to be converted into a different signal type (which for many types of signals, may be nothing more than a frequency conversion, although other more complex signal conversions are contemplated) in order to be communicated as the transceiver signal. In addition, advantages may be gained by having the transceiver signal in a frequency spectrum that facilitates communication over coaxial cable without overlapping with the broadcast audio and video services signal that is also communicated over the coaxial cable, since both signals, the transceiver signal and the broadcast audio and video services signal are communicated over some of the same coaxial cable that serves as the backbone for data services.

Figure 2B:
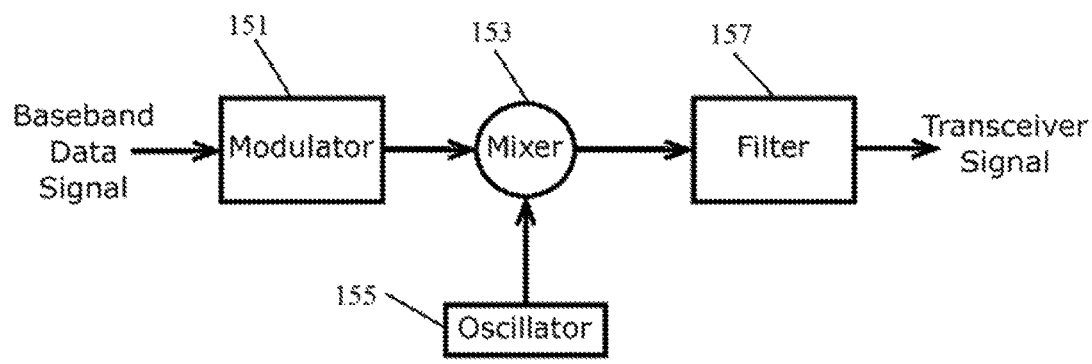
FIG. 2B is a schematic diagram showing the transmit side of a transceiver for the gateway device of FIG. 2A.

The transmit side of the signal transceiver 143 of FIG. 2A is shown in FIG. 2B. The baseband data signal received by the signal transceiver 143 passes into a modulator 151, which servers to convert the baseband data signal into the signal form chosen for the desired transceiver signal. A mixer 153 receives the output of the modulator 151, and the mixer 153 also receives an oscillator input from a local oscillator 155. As is well known in the art, the mixer 153 produces two signals as output, one at the sum of the input frequencies and one at the difference of the input frequencies. Output from the mixer 153 passes through a band pass filter 157, which is configured to pass only one of the two signals output from the mixer 153. The output of the band pass filter 157 is the transceiver signal.

Figure 2C:
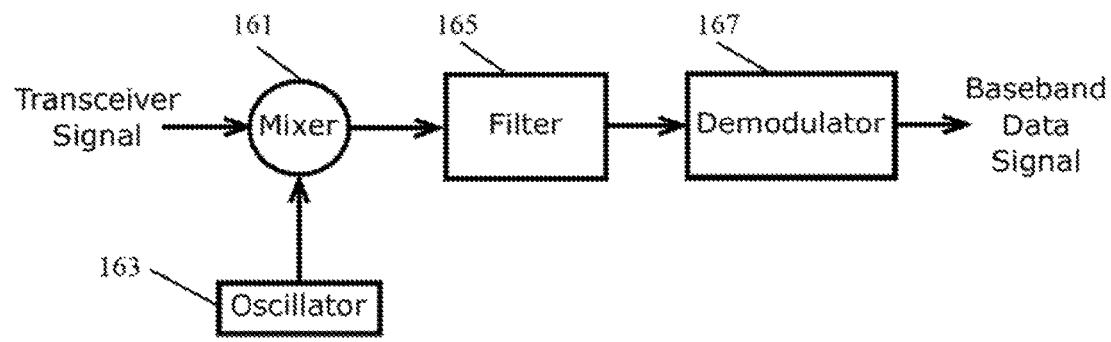
FIG. 2C is a schematic diagram showing the receive side of a transceiver for the gateway device of FIG. 2B.

The receive side of the signal transceiver 143 of FIG. 2A is shown in FIG. 2C. The transceiver signal received by the signal transceiver 143 passes into a mixer 161, and the mixer 161 also receives an oscillator input from a local oscillator 163. The mixer 161 produces two signals as output, one at the sum of the input frequencies and one at the difference of the input frequencies. Output from the mixer 161 passes through a second band pass filter 165, which is configured to pass only one of the two signals output from the mixer 161. The output of the second band pass filter 165 then passes through a demodulator 167, which produces the baseband data signal as output.

In certain embodiments, where the baseband data signal is already in the signal form chosen for the desired transceiver signal (but not at the frequency desired for the transceiver signal), the demodulator 167 may be omitted.

As is known to those of skill in the art, typical broadcast audio and video services signals are communicated in a frequency spectrum of about 500 MHz to about 1.5 GHz. Therefore, the lower end of the frequency spectrum for the transceiver signal should be above 1.5 GHz, although to avoid overlap and allow for expansion of the broadcast audio and video services signals, the lower end of the frequency spectrum for the transceiver signal should be at least 1.8 GHz, or even above 2.0 GHz. Certain WiFi standards use frequencies in the range of one or both of 2.4 GHz-2.5 GHz and 5.0 GHz-5.24 GHz so that WiFi signals may be communicated between the various signal transceivers, as transceiver signals, without the need for conversion at any stage other than at the signal transceiver 143 of the CATV gateway device 113. To simplify the use of WiFi frequencies further, the cable modem 139 may be configured to demodulate the data services signal directly into a WiFi signal. In other embodiments, the cable modem may demodulate the data services signal to a baseband data signal, such as an Ethernet signal, and that Ethernet signal may then be modulated to generate a WiFi signal.

In certain embodiments, the gateway access point may operate at the Win standard frequency range of 5.0 GHz-5.24 GHz, and some or all of the access points included in the extension devices 123 (see below) may operate at the WiFi standard frequency range of 2.4 GHz-2.5 GHz.

In other embodiments, the cable modem 139 may be configured to demodulate the data services signal into an Ethernet signal, and the signal transceiver 143 of the CATV gateway device 113 may convert the Ethernet signal into a transceiver signal having a frequency spectrum in the 3 GHz-6 GHz range. One frequency spectrum that has been found to work particularly well is the 3.3 GHz-4.7 GHz range, which may be implemented using an Ethernet-over-coax bridge, such as one available from Pulse-Link of Carlsbad, Calif. Various implementations of Ethernet-over-coax are disclosed in U.S. Pat. Nos. 6,781,530; 6,782,048; 6,836,223; 6,937,674; 7,046,618; 7,099,368; 7,190,722; and 7,299,042, the disclosures of which are incorporated herein by reference in their entirety.

Certain benefits may be realized by implementing the above system for distributing a transceiver signal over coaxial cable to create a network around a property and within structures on the property. For one, the higher frequency spectrums were previously unusable, as coaxial cable was not designed for use with such higher frequencies. Likewise, existing systems in homes and businesses that are used to connect to the coaxial cables were not designed to operate at the higher frequencies. The use of the higher frequencies, on the backbone that was not designed for those frequencies, separates the frequency bands of the transceiver signals from the broadcast audio and video signals, thereby enabling a broader distribution of the data signal around a property and within structures on the property. With more wireless access points on a property, each wireless access point may be operated at a lower power. In turn, this enables wireless devices accessing the wireless access points to operate at a lower power, thereby enabling the battery life of some mobile devices to be extended and enabling communication between mobile devices and the wireless access point to occur more frequently at higher, more optimum, data rates, through frequency reuse.

The CATV gateway device 113 may he configured to provide other functionality, video transcoding, video storage, maintaining and enforcing conditional network access privileges, IP routing, and IP video.

Figure 3:
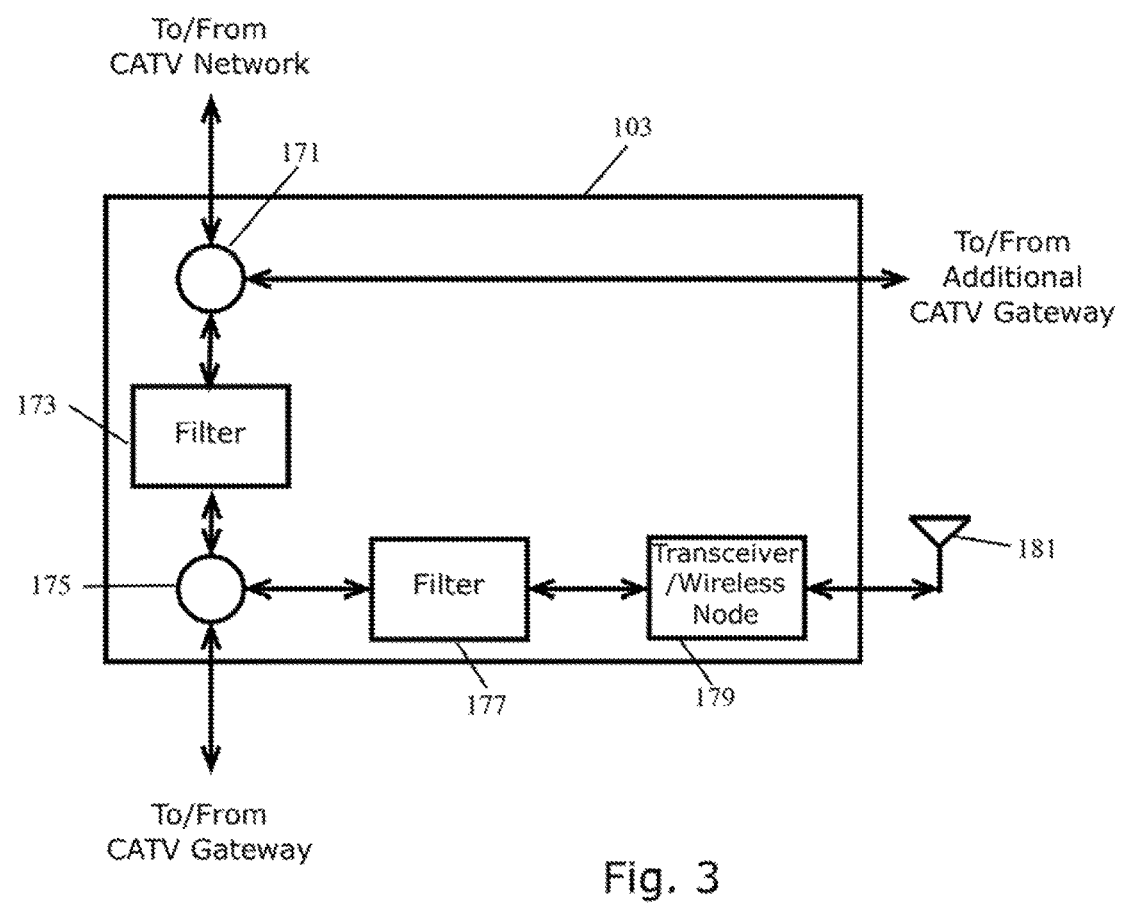
FIG. 3 is a schematic diagram showing a tap-off device for the system of FIG. 1.

A detailed view of an embodiment of the CATV tap-off device 103 is shown in FIG. 3. This CATV tap-off device 103 includes the CATV signal splitter 171 which splits the incoming CATV signal off from the main CATV signal and passes the incoming CATV signal through a band reject filter 173 to a tap-off signal splitter 175. As indicated above, the CATV tap-off device 103 may pass the CATV signal through to additional CATV tap-off devices. The band reject filter 173 rejects the frequencies at which the transceiver signal operates so that the transceiver signal is isolated from and kept off the CATV network. The tap-off signal splitter 175 couples the incoming CATV signal to and from the gateway coaxial cable 111, and the tap-off signal splitter 175 also couples the transceiver signal received over the gateway coaxial cable 111 through a band pass filter 177 and to a signal transceiver 179. The band pass filter 177 passes frequencies at which the transceiver signal operates. The signal transceiver 179 is coupled to an antenna 181 so that the CATV tap-off device 103 can serve as a wireless access point, such as a WiFi access point. Depending upon the type of signal used as a basis for the transceiver signal, the signal transceiver 179 may be coupled to the antenna 181 through a wireless node, as shown, so that the output of the signal transceiver 179 may be convened into a wireless signal. Alternatively, the functionality of a wireless node may be incorporated into the signal transceiver 179.

The signal transceiver 179 of the CATV tap-off device 103 operates with the same functionality as described above for the signal transceiver of the CATV gateway device. The signal transceiver 179 is configured to he complementary to the way in which the signal transceiver of the CATV gateway device operates. Therefore, in certain embodiments, the signal transceiver 179 may be configured to convert the transceiver signal to and from the baseband data signal (i.e., the baseband data signal type generated by the cable modem of the CATV gateway device), which may be an Ethernet signal or any other type of signal.

One advantage of the CATV tap-off device 103, as compared to those of the prior art, is that it does not include a cable modem. Instead, the cable modem of the CATV gateway device, which is placed on a property, is leveraged to enable providing wireless network service from the CATV tap-off device 103.

Figure 4:
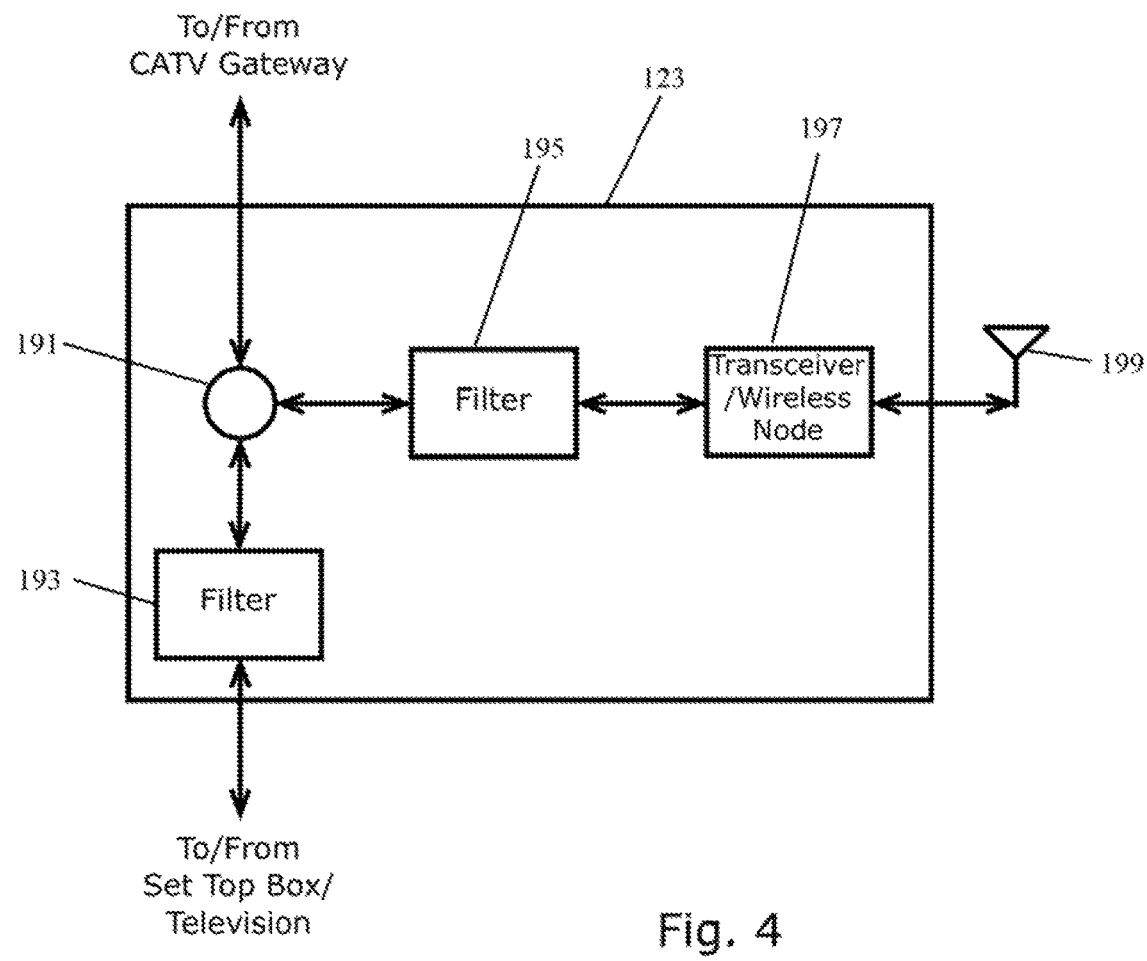
FIG. 4 is a schematic diagram showing an extension device for the system of FIG. 1.

A detailed view of an embodiment of an extension device 123 is shown in FIG. 4. This extension device 123 includes a signal splitter 191 to split the incoming signal, which includes both the broadcast audio and video services signal and the transceiver signal, from the CATV gateway device. The signal splitter 191 couples the incoming signal to a band reject filter 193 and to a band pass filter 195. The band reject filter 193 rejects the frequencies at which the transceiver signal operates so that the broadcast audio and video services signal may be passed to a set-top box or a television Without interference from the transceiver signal. The band pass filter 195 passes frequencies at which the transceiver signal operates through to a signal transceiver 197.

The signal transceiver 197 is coupled to an antenna 199 so that the extension device 123 can serve as a wireless access point, such as a WiFi access point Depending upon the type of signal used as a basis for the transceiver signal, the signal transceiver 197 may be coupled to the antenna 199 through a wireless node so that the output of the signal transceiver 197 may be converted into a wireless signal. Alternatively, the functionality of a wireless node may be incorporated into the signal transceiver 197.

In certain embodiments, the plurality of wireless access points may operate independently of one another, with the power output and wireless channel of each access point being passively set or actively controlled to by the programmable processor of the CATV gateway device, the latter by incorporation of a control channel within the transceiver signal, to reduce and/or prevent interference between different wireless access points. The programmable processor of the CATV gateway device may also control hand-offs between different wireless access points when a computing device moves in relation to the different wireless access points.

The signal transceiver 197 of the extension device 123 operates with the same functionality as described above for the signal transceiver of the CATV gateway device. The signal transceiver 197 is configured to be complementary to the way in which the signal transceiver of the CATV gateway device operates. Therefore, as appropriate, the signal transceiver 197 may be configured to act solely as a signal amplifier, so that the transceiver signal is amplified when being sent to the signal transceiver of the CATV gateway device. In other embodiments, the signal transceiver 197 may be configured to convert the transceiver signal to and from the baseband data signal (i.e., the baseband data signal type generated by the cable modem of the CATV gateway device), which may be an Ethernet signal or any other type of signal.

In certain embodiments, the extension device 123 may also include a wired network connection, such as an Ethernet connection, so that computing devices may connect to the network and utilize the data services through a wired connection.

The system of FIGS. 1-4 utilizes the modem included at the CATV gateway device to generate a more ubiquitous wireless network on a property, in a building situated on a property, or both, and that wireless network can extend seamlessly both inside and outside of structures on the property. For embodiments in which the transceiver signal is based upon a wireless signal, such as a WiFi signal, then the transceiver at the CATV gateway may be configured to utilize the multiple antennas, which may be included in the CATV gateway devices, the CATV tap-off devices, and the extension devices, to provide improved RE communications, in terms of throughput, range, delay, and accuracy, of both the transmitted and received transceiver signals. In addition, the system can be adapted to take advantage of known Multiple Input/Multiple Output (MIMO), advanced beam forming, adaptive array, and other "smart antenna" technologies.

Figure 5:
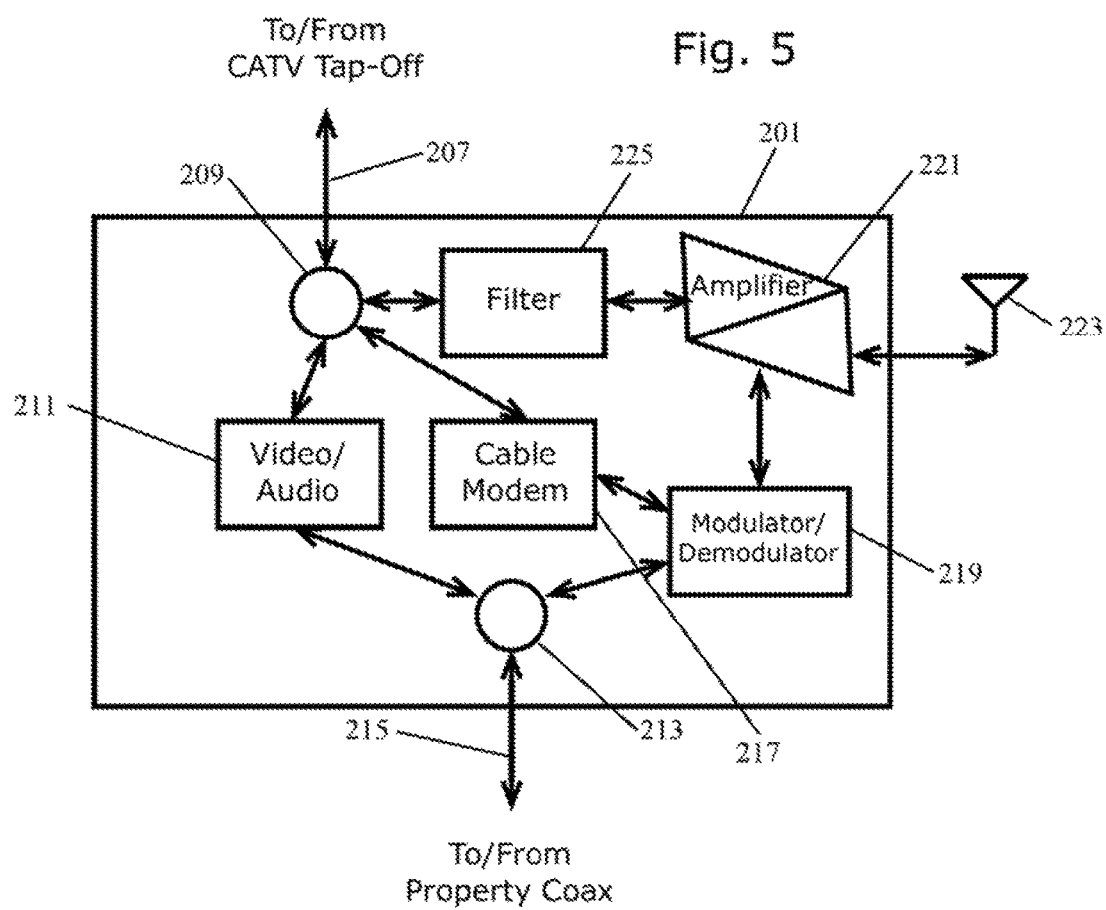
FIG. 5 is a schematic diagram showing a first alternative gateway device for the system of FIG. 1.
Figure 6:
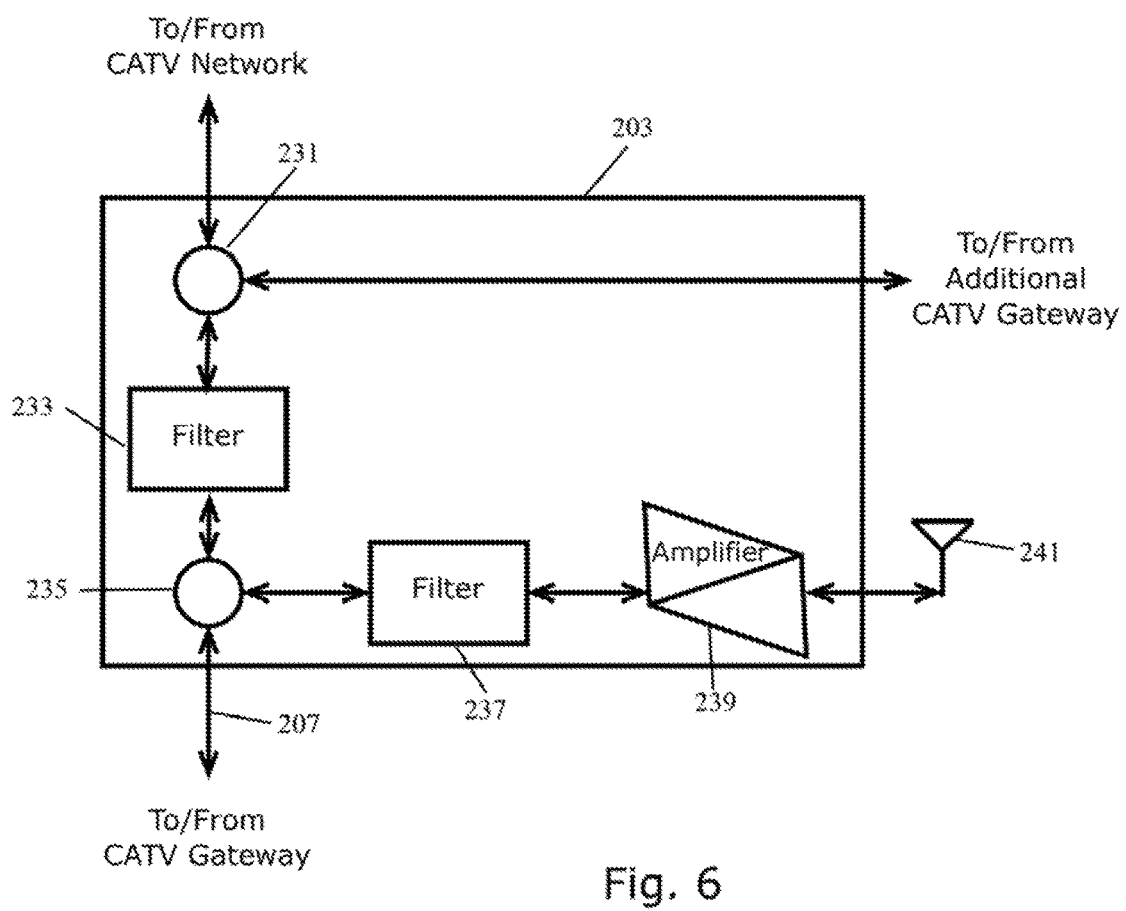
FIG. 6 is a schematic diagram showing a first alternative tap-off device for the system of FIG. 1
Figure 7:
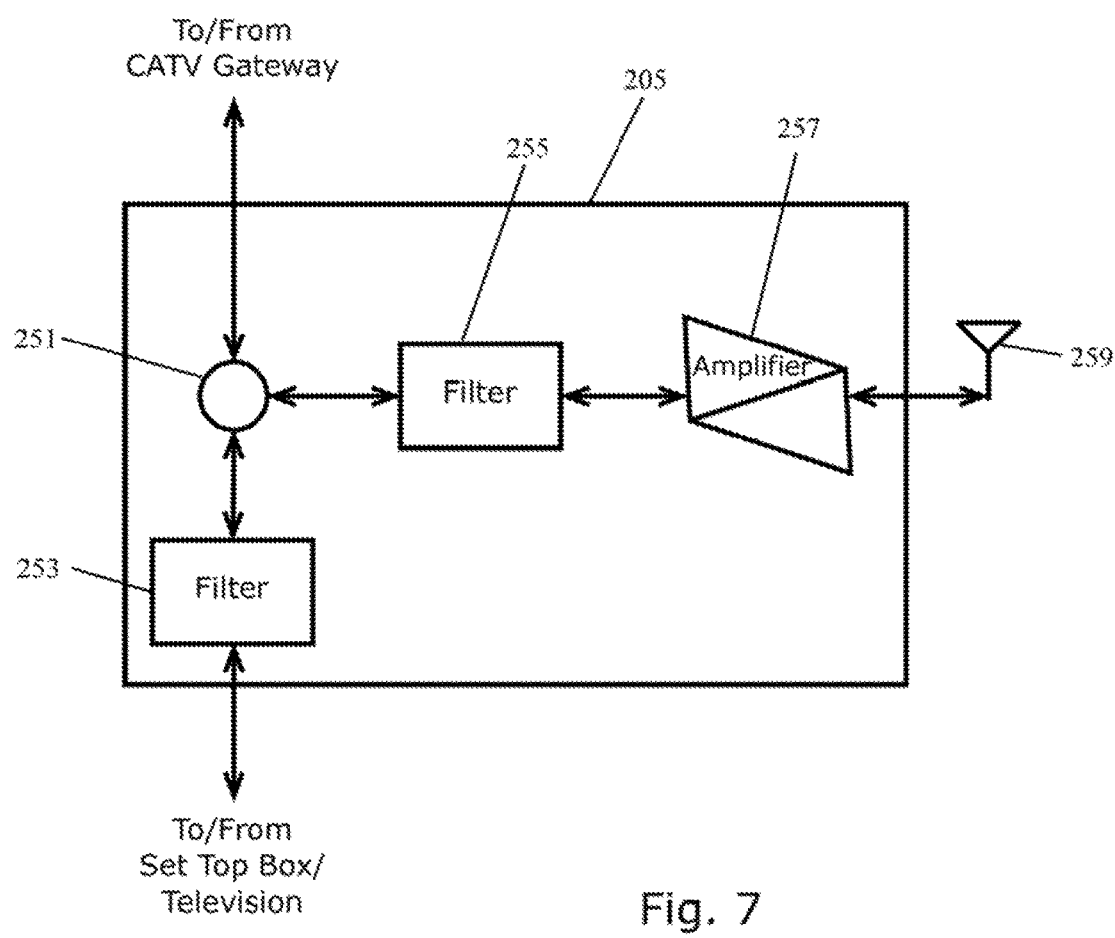
FIG. 7 is a schematic diagram showing a first alternative extension device for the system of FIG. 1.

Alternative embodiments for each of the CATV gateway device 201, the CATV tap-off device 203, and the extension device 205 are shown in FIGS. 5-7, respectively. The incoming CATV signal passes into the CATV gateway device 201 from the gateway coaxial cable 207, and a gateway signal splitter 209 splits the incoming CATV signal into the broadcast audio and video services signal and the data services signal. The broadcast audio and video services signal passes into a video and audio processor 211, which processes the broadcast audio and video services signal for use on the property and then passes the processed broadcast audio and video services signal to a signal combiner 213. The signal combiner 213 is coupled to a distribution coaxial cable 215, which connects the output signal from the CATV gateway device 201 to the coaxial cable network for the property. The coaxial cable network may have a plurality of termination points, and these termination points may include set-top boxes, televisions, extension devices 205, or any other device used by the property occupant to receive and process the output signal from the CATV gateway device 201.

The data services signal passes from the gateway signal splitter 209 to a cable modem 217, which demodulates the data services signal into a baseband data signal. In certain embodiments, the baseband data signal may be an Ethernet signal. In other embodiments, the baseband data signal may be any other signal type which suits the needs of a particular design implementation. The baseband data signal passes into a modulator/demodulator 219, which modulates the baseband signal to generate a wireless signal. The wireless signal may be a WiFi signal, or any other type of signal appropriate for communicating wirelessly between computing devices. The wireless signal passes into an amplifier 221, from which it may be wirelessly transmitted over the antenna 223, so that the CATV gateway device may serve as a gateway access point. In certain embodiments, the antenna 223 may be omitted. The amplified wireless signal may also pass onto the gateway coaxial cable 207, through a band pass filter 225, and back to the CATV tap-off device 203. The modulator/demodulator 219 may also communicate the wireless signal with the signal combiner 213, from which the wireless signal passes toward one or more extension devices 205, as shown in FIG. 1.

The alternative embodiment of the CATV tap-off device 203 is shown in FIG. 6, This CATV tap-off device 203 includes the CATV signal splitter 231 which splits the incoming CATV signal off from the main CATV signal and passes the incoming CATV signal through a band reject filter 233 to a tap-off signal splitter 235. As indicated above, the CATV tap-off device 203 may pass the CATV signal through to additional CATV tap-off devices. The band reject filter 233 rejects the frequencies at which the wireless signal from the CATV gateway device 201 signal operates so that the wireless signal is isolated from and kept off the CATV network. The tap-off signal splitter 235 couples the incoming CATV signal to the gateway coaxial cable 207, and the tap-off signal splitter 235 also couples the wireless signal received over the gateway coaxial cable 207 through. a band pass filter 237 and to an amplifier 239. The band pass filter 237 passes frequencies at which the wireless signal operates. The amplifier 239 is coupled to an antenna 241 so that the CATV tap-off device 203 can serve as a wireless access point, such as a WiFi access point.

The alternative embodiment of the extension device 205 is shown in FIG. 7. This extension device 205 includes a signal splitter 251 to split the incoming signal, which includes both the broadcast audio and video services signal and the wireless signal, from the CATV gateway device. The signal splitter 251 couples the incoming signal to a band reject filter 253 and to a band pass filter 255. The band reject filter 253 rejects the frequencies at which the wireless signal operates so that the broadcast audio and video services signal may be passed to a set-top box or a television without interference from the wireless signal. The band pass filter 255 passes frequencies at which the wireless signal operates through to an amplifier 257, which is coupled to an antenna 259 so that the extension device 205 can serve as a wireless access point, such as a WiFi access point.

In this alternative embodiment, a wireless signal that has a frequency spectrum outside of the frequency spectrum in, which typical broadcast audio and video services signals are communicated may be used as a basis for creating a wireless network on a property and/or in and around a structure on the property. Using such a system, some of the advantages discussed above may be realized.

Figure 8:
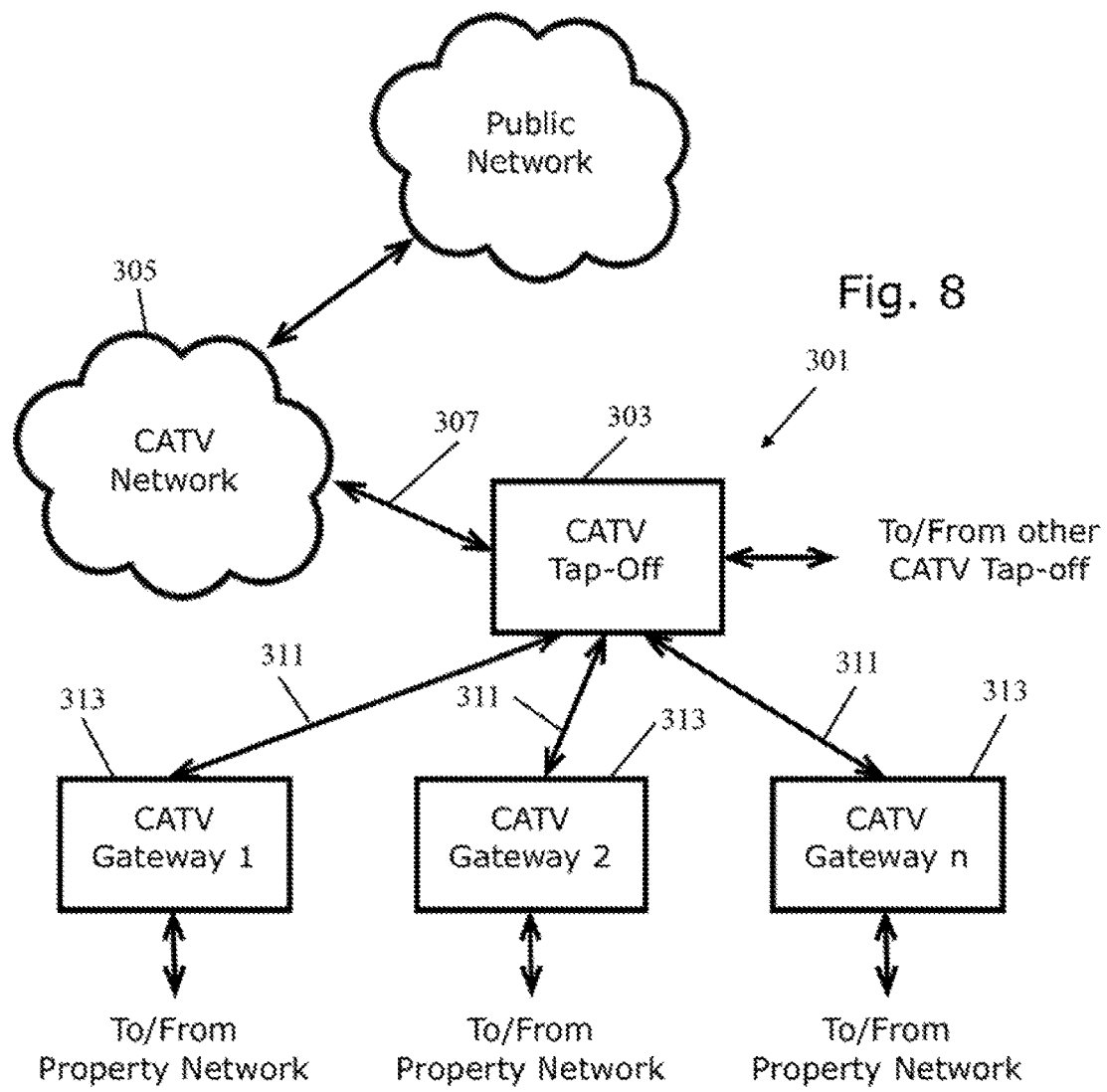
FIG. 8 is a schematic diagram showing a second system for providing data services through a CATV tap-off device.
Figure 9:
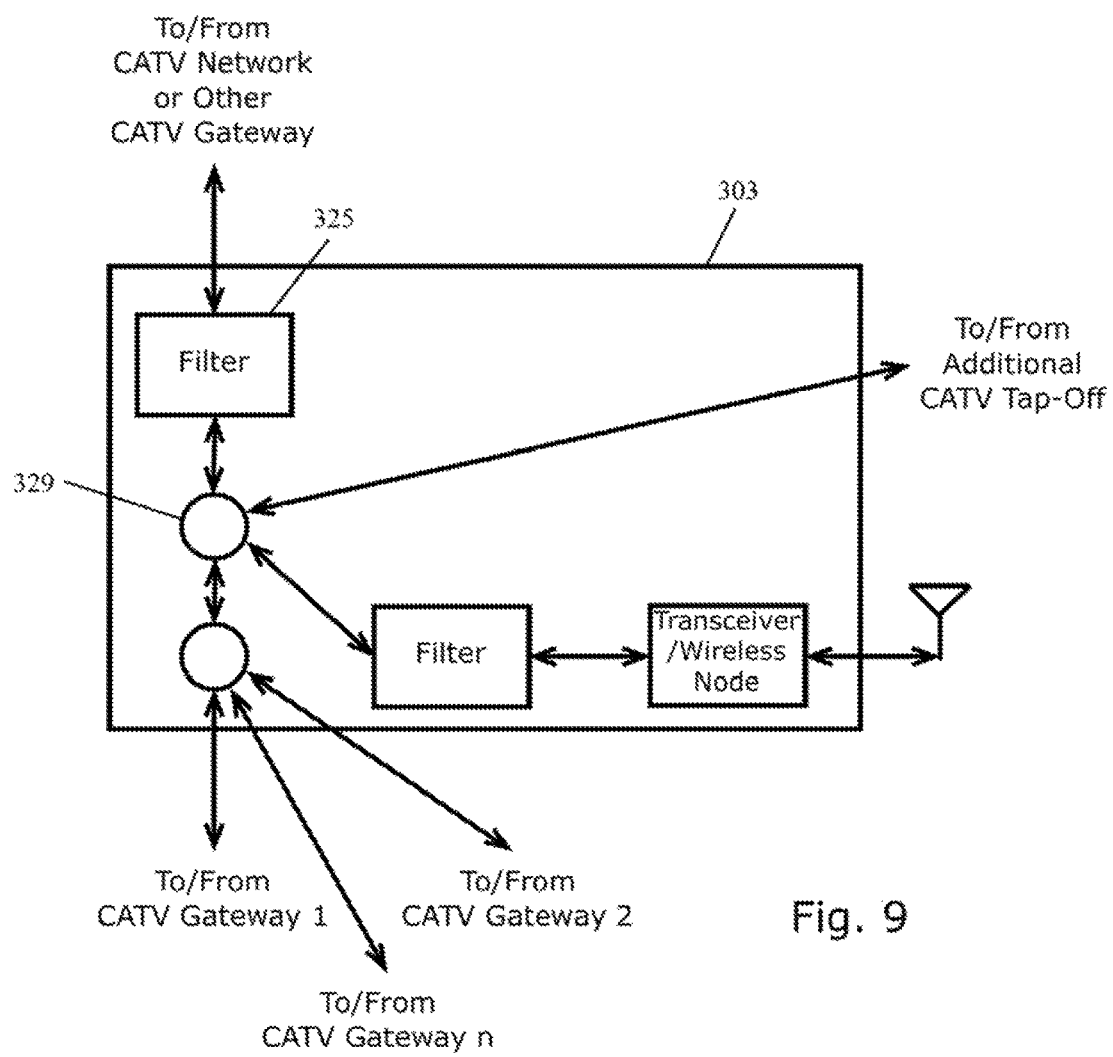
FIG. 9 is a schematic diagram showing a tap-off device for the system of FIG. 8.

FIG. 8 shows a second system 301 for providing data services through a CATV tap-off device 301 Like the system of FIG. 1, the CATV tap-off device 303 is connected to the CATV network 305 through a network coaxial cable 307 for receiving a CATV signal. The network coaxial cable 307 communicates with the CATV tap-off device 303 to provide the CATV signal to the CATV tap-off device 303. The CATV tap-off device 303 is connected through gateway coaxial cables 311 to several CATV gateway devices 313, each of which are placed on a property or on several properties, generally on or around the exterior of a building or structure, or within the building or structure, to provide easier access for service calls, or within a building or structure. The CATV tap-off device 303 may be connected to a of additional CATV gateway devices by passing through the CATV signal. As is shown in FIG. 9, a band reject filter 325 is included in the CATV tap-off device 303 to reject the frequencies at which the transceiver signal operates so that the transceiver signals are isolated from and kept off the CATV network 303. Additional band reject filters may also be included between CATV gateway devices. Any such additional hand reject filters would similarly reject the frequencies at which the transceiver signals operate for each respective CATV tap-off device so that the transceiver signal for each CATV tap-off device is isolated from other CATV tap-off devices.

Each of the CATV gateway devices 313 may be coupled to one or more extension devices. Each of the CATV gateway devices 313 are as described above in FIG. 2A, and each of the extension devices are as described above in FIG. 4. Again, the CATV tap-off device 303 is similar to the CATV tap-off device described above and shown in FIG. 3, with the position of the band reject filter 325 in the CATV tap-off device 303 shown in FIG. 9 being different relative to the CATV signal splitter 329. As indicated above, the band reject filter 325 is positioned to isolate the transceiver signal from the CATV network or from upstream CATV tap-off devices.

With this system 301, a more ubiquitous wireless network may be established throughout a property and/or structure, or throughout several properties and/or structures. This more ubiquitous wireless network may take advantage of combining bandwidths available from multiple CATV gateway devices to provide additional bandwidth to the wireless node at the CATV tap-off device. The increased bandwidth may also be used to direct additional bandwidth from one or more CATV gateway devices to another one of the CATV gateway devices when additional bandwidth is needed at the latter. This bandwidth sharing may be accomplished by communications between the programmable processors included with the signal transceivers of each of the CATV gateway devices. As an example, the programmable processor of a first of the signal transceivers may request additional bandwidth from the programmable processors of other, less loaded, signal transceivers, with the additional bandwidth then being provided by routing at least a portion data service signals through the less loaded signal transceivers to the first signal transceiver. As indicated above, communications between the various programmable processors may be accomplished by establishing a control channel within the transceiver signal that is reserved for this and other command and control communications. In certain embodiments, the signal transceiver of the CATV tap-off device may also include a programmable processor which communicates with the programmable processors of the signal transceivers within each CATV gateway device to effectuate bandwidth redistribution on an as-needed basis. The programmable processor may be programmed to redistribute bandwidth on an on-demand basis by determining in real-time which other CATV gateways have bandwidth that may be allocated to another of the CATV devices, or it may be programmed to redistribute bandwidth based on demand and statistical analysis of past usage. A combination of both redistribution techniques may also be implemented.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A method for providing data communication services, the method comprising
    splitting a CATV signal from a CATV network at a cable television (CATV) tap-off device to pass a split CATV signal from the CATV tap-off device to a CATV gateway device over a first coaxial cable, the CATV gateway device being located within a building receiving data communication services;
    splitting the split CATV signal into a television signal and a baseband data signal at the CATV gateway device;
    communicating the baseband data signal as a transceiver signal over the first coaxial cable to a first signal transceiver of the CATV tap-off device from a second signal transceiver of the CATV gateway device; and
    wirelessly transmitting a first wireless signal at the CATV tap-off device based on the received transceiver signal.

2. The method of claim 1, further comprising converting the transceiver signal to the first wireless signal at the CATV tap-off device.

3. The method of claim 1, wherein splitting the CATV signal includes converting the baseband data signal into the transceiver signal.

4. The method of claim 1, further comprising generating a second wireless signal at the CATV gateway device based on the baseband data signal.

5. The method of claim 1, further comprising:
communicating the baseband data signal as a transceiver signal over a second coaxial cable to a third signal transceiver of an extension device from the second signal transceiver of the CATV gateway device; and
converting the transceiver signal to a third wireless signal at the extension device.

6. The method of claim 1, further comprising:
drawing bandwidth through the first signal transceiver simultaneously from other CATV gateway devices communicably coupled to the CATV tap-off device.

7. The method of claim 1, further comprising:
increasing a first bandwidth available to the CATV gateway device through the split CATV signal by supplementing the first bandwidth with bandwidth available to other CATV gateway devices communicably coupled to the CATV tap-off device.

8. A system for providing data communication services, the system comprising
a cable television (CATV) tap-off device including a signal splitter communicably coupled to a tap-off access point, the CATV tap-off device being configured to communicate a CATV signal with a CATV network through the splitter; and
a CATV gateway device located within a building receiving data communication services, the CATV gateway device communicably coupled to the signal splitter through a first coaxial cable, the first coaxial cable communicating the CATV signal from the CATV tap-off device to the CATV gateway device, wherein:
the CATV gateway device includes a wireless signal converter;
the CATV gateway device is configured to split the CATV signal into a television signal and a baseband data signal;
the wireless signal converter is configured to convert the baseband data signal to a wireless signal and to transmit the wireless signal over the first coaxial cable to the tap-off access point; and
the tap-off access point is configured to wirelessly transmit the wireless signal.

9. The system of claim 8, wherein CATV tap-off device includes a signal amplifier operatively coupled to the tap-off access point and configured to amplify the wireless signal.

10. The system of claim 8, wherein the CATV gateway device includes a signal amplifier operatively coupled to the wireless signal converter and configured to amplify the wireless signal.

11. The system of claim 8, wherein the wireless signal converter comprises a wireless access point configured to wirelessly transmit the wireless signal.

12. The system of claim 8, wherein the wireless signal is transmitted in a first frequency spectrum over the first coaxial cable, the first frequency spectrum being non-overlapping with a second frequency spectrum of the CATV signal.

13. The system of claim 12, wherein the CATV tap-off device further includes a band pass filter operatively disposed between the signal splitter and the wireless signal converter, the band pass filter being configured to pass the first frequency spectrum.

14. The system of claim 12, wherein the first frequency spectrum is between 2.4 GHz to 2.5 GHz or between 5.0 GHz and 5.24 GHz.

15. The system of claim 8, wherein the CATV gateway device comprises a cable modem configured to demodulate the CATV signal into the baseband data signal.

16. The system of claim 15, wherein the baseband data signal is an Ethernet signal.

17. The system of claim 8, wherein the CATV tap-off device is positioned external to the building receiving the data communication services.

18. The system of claim 8, wherein comprising an extension device communicably coupled to the CATV gateway device through a second coaxial cable, the extension device including an extension access point, wherein the wireless signal converter is configured to transmit the wireless signal over the second coaxial cable to the extension access point, and the extension access point is configured to wirelessly transmit the wireless signal.

19. The system of claim 18, wherein the extension device includes a signal amplifier operatively coupled to the extension access point and configured to amplify the wireless signal.

20. A method for providing data communication services, the method comprising:
receiving, at a cable television (CATV) tap-off device, a CATV signal from a CATV network;
splitting the CATV signal at the CATV tap-off device to generate a split CATV signal;
transmitting the split CATV signal over a cable from the CATV tap-off device to a CATV gateway device, the CATV gateway device being located within a building;
generating, at the CATV gateway device, a baseband signal from the split CATV signal;
transmitting the baseband data signal over the cable from the CATV gateway device to the CATV tap-off device; and
transmitting a wireless signal at the CATV tap-off device based on the received baseband data signal.

* * * * *